United States Patent [19]

Bockholt et al.

[11] Patent Number: 4,488,679
[45] Date of Patent: Dec. 18, 1984

[54] CODE AND READING SYSTEM

[75] Inventors: Karlheinz H. Bockholt, Delavan; John F. Harris, III, Franksville, both of Wis.

[73] Assignee: Western Publishing Company, Inc., Racine, Wis.

[21] Appl. No.: 437,928

[22] Filed: Nov. 1, 1982

[51] Int. Cl.³ .............................................. G06K 7/12
[52] U.S. Cl. ..................................... 235/469; 235/472
[58] Field of Search ....................... 235/469, 454, 472

[56] References Cited

U.S. PATENT DOCUMENTS

| | | | |
|---|---|---|---|
| 3,176,141 | 3/1965 | Siegemund | 250/219 |
| 3,196,393 | 7/1965 | Siegemund | 235/469 |
| 3,567,909 | 3/1971 | Allen | 235/469 |
| 3,632,993 | 1/1972 | Acker | 235/61.11 E |
| 3,663,801 | 5/1972 | Wahil et al. | 235/61.11 E |
| 3,684,869 | 8/1972 | Christie et al. | 235/61.11 E |
| 3,835,297 | 9/1974 | Inoue et al. | 235/61.11 E |
| 3,918,029 | 11/1975 | Lemelson | 235/472 |
| 3,976,973 | 8/1976 | Martin | 235/472 X |
| 3,985,999 | 10/1976 | Yoneyama | 235/61.11 E |
| 4,023,040 | 5/1977 | Weber | 235/469 |
| 4,266,122 | 5/1981 | Schmidhauser | 235/454 |
| 4,286,146 | 8/1981 | Uno et al. | 235/456 |
| 4,315,245 | 2/1982 | Nakahara et al. | 340/146.3 AG |
| 4,330,796 | 5/1982 | Anagnostopoulos et al. | 358/213 |

Primary Examiner—Harold I. Pitts
Attorney, Agent, or Firm—James G. O'Neill

[57] ABSTRACT

A code reading system is disclosed utilizing a novel, multicolored, densely packed code read by a scanner which is placed over the code and held in place while the scanner performs its reading function. The scanner includes lighting means which are sequentially flashed on the code, as well as optical means to pick up an image received from the code during each sequential flash. The optical means directs the received image onto an imager where it is recorded. After a predetermined sequence, the received images recorded on the imager are fed to a microprocessor for storage and manipulation.

15 Claims, 8 Drawing Figures

72A — CCD CHIP

39 — SINGLE LIGHT SOURCE

41 — MULTICOLORED CODE

CODE AND READING SYSTEM

BACKGROUND OF THE INVENTION

The present invention relates to an improved code and reading system therefor, and in particular to an improved code and reading system which uses multiple colors to allow a large quantity of information to be densely packed into a smaller area and accurately read.

Known code means, such as various bar code formats are used to enter information into a computer through mechanized or hand-held bar code readers. These readers, usually take the form of a wand which is mechanically passed over the bar code, or may comprise fixed readers under which the code is passed. Experience has shown that the bar codes must be very carefully printed or errors will appear due to the sensitivity of the readers. In addition, the readers usually include electronic or other means to compensate for the varying velocities of either the hand held wands used by different people, or the angle of the code to be read when passed by a fixed reader.

Examples of various bar codes and bar code readers are shown in U.S. Pat. Nos. 3,918,029; 4,275,381; 4,283 622; 4,323,772; and 4,329,574. However, the codes and means for reading the codes disclosed in these patents are limited in the amount of information that can be stored, and the reading means disclosed therein are different than the reading means of the present invention.

In addition, there are known systems having readers and/or codes which utilize different colors within the codes. The readers may include more than one light source to distinguish between the various colors being read. Examples of such codes and readers are shown in U.S. Pat. Nos. 3,176,141; 3,632,993; 3,663,801; 3,684,868; 3,835,297; 3,985,999; 4,023,040; 4,266,122; 4,286,146; 4,315,245; and 4,329,576. While these patents refer to codes utilizing various colors, and unique readers for recognizing and interpreting these codes, all of these patents fail to disclose either the unique code printed in multi colors on a page of a book or magazine, or the novel reading structure as set forth in the present application.

SUMMARY OF THE INVENTION

The present invention provides a unique, multi-colored code which is read by a novel, optically sensitive device. The preferred readers are of the static type, that is, no movement of the reader with respect to the code during actual reading is required. Therefore, no velocity problems are present and errors in reading are greatly reduced, if not eliminated. This provides for easier and faster reading, and at the same time enables more information to be packed into the code when printed in a book or magazine, thereby overcoming many of the problems of presently available codes and readers.

The code comprises densely packed bits which may be referred to as dots or shapes, corresponding to the smallest elements of the image, being read. An example of such a dot would be the picture elements (pixels) of an ordinary television screen. Each of the dots contain only one color, and dots of varying colors or gradations in the same color may be arranged in convenient groups. The size of the groups of dots being read will depend on the type of reader used and the information to be conveyed. Each group of dots being read may be referred to as a data field, and several fields, corresponding to an entity of information will comprise a frame.

The preferred reader of the invention include an exterior enclosure to shut out ambient light, and an image sensor of suitable sensitivity within the enclosure. Each reader may also include a lens system accurate enough to create an image of the data being read on the surface of the image sensor, a light or lamp system for illumination of the data with, either light in the colors being used or while light in conjunction with an image sensor sensitive enough to interpret the different colors with or without the aid of filters and lenses. The light system may be operated by a sequencing system to enable each of the colors used in the code to be separately read in rapid succession. An optical sensing means is provided in the reader to signal approximate or coarse alignment of the reader with respect to the data field being read. Fine alignment of the code with respect to the reader is handled by firmware contained within the microprocessor system associated with the reader. In addition, each reader preferably includes a switch to activate the entire system once a reader has been properly placed on and aligned over the material to be read.

In use, after a reader is placed over the data to be read in proper alignment and the sensing means within the system confirms the proper alignment, the data field is sequentially illuminated by the light system, one color at a time. The image sensing system within the reader recognizes the elements corresponding to the color being illuminated, and stores this information, preferably in a RAM memory of a microprocessor associated with the reader. This process is repeated for each of the remaining colors printed in the code until the RAM memory contains all of the data printed in the field being read. The microprocessor system then acts on the stored data using previously prepared programs to perform assigned functions. The microprocessor will also extract information about white and black dots which might be in the code from the information received with respect to the other colors which have been read.

With the improved code and reading head of the present invention, a microcomputer may be quickly and easily programmed directly from a printed page, without the need of magnetic storage medium or the like

BRIEF DESCRIPTION OF THE DRAWINGS

The present invention will be described with reference to the accompanying drawings wherein.

DESCRIPTION OF THE PREFERRED EMBODIMENT

Figure 1:
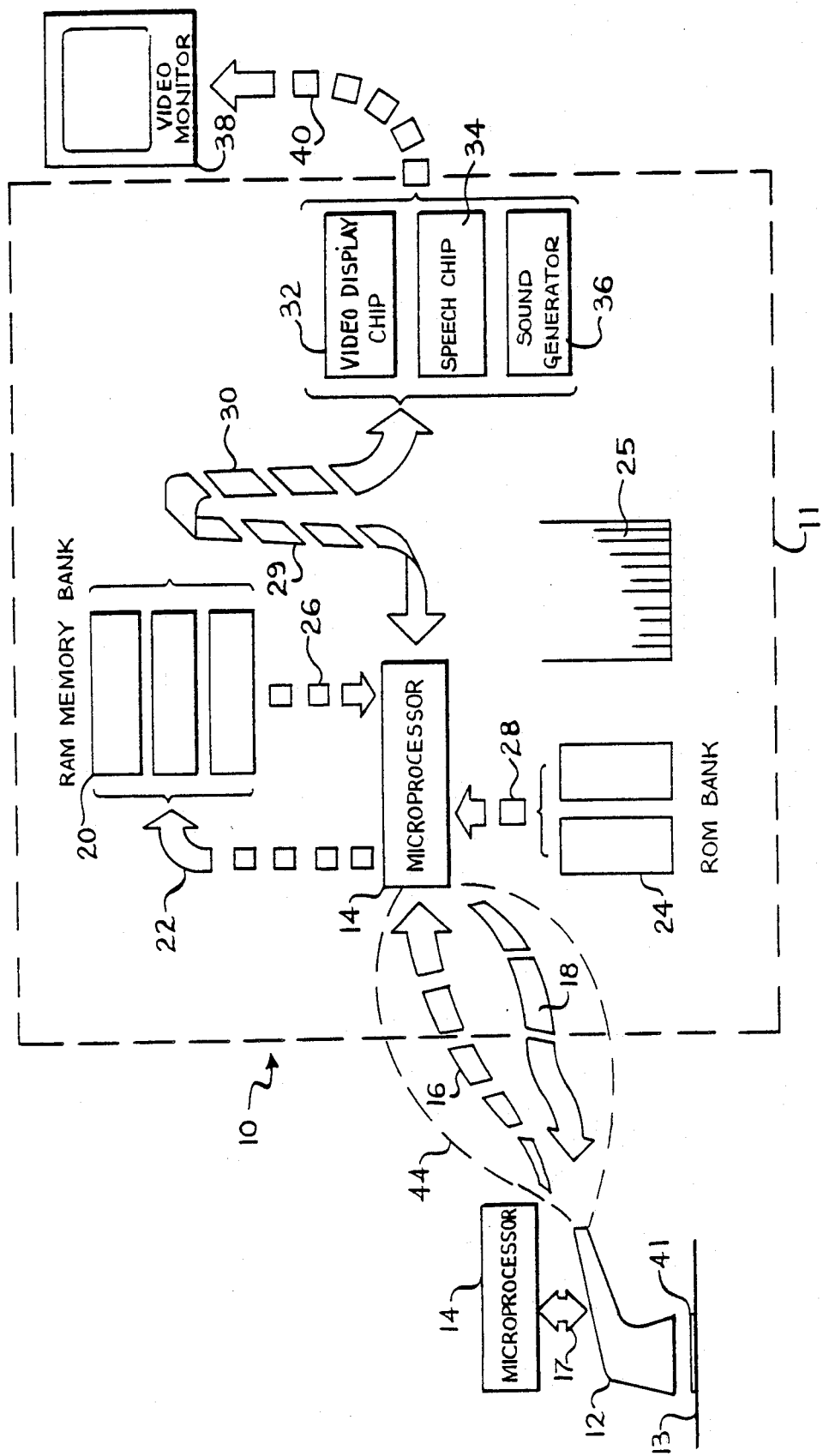
FIG. 1 is a schematic diagram of one example of a system of the present invention showing a reader in reading position over the code and attached to a microprocessor.

Referring now to the drawings wherein like numerals throughout the several views correspond to like elements, numeral 10 indicates a novel code and code reading system of the present invention. The system is preferably contained in a portable housing 11, and includes a scanner or reading head 12 for reading a code on a printed page or the like 13, described more fully hereinafter.

Scanner 12 is connected to a microprocessor 14 either contained directly in the scanner 12, or in the portable housing, in any known manner. Information and/or image data flows to or from the microprocessor via the scanner, as indicated by arrows 16, 17, and 18. The information from the scanner is first directed into a RAM memory bank 20 in the microprocessor, as shown by broken arrow 22.

The microprocessor includes a ROM memory bank 24, of any desired size, depending on the information to be stored therein, and may include connecting means 25 for additional memory, as required. After a pre-determined amount of information or data is stored in RAM, the microprocessor will take the stored information, as shown by broken arrows 26 and act on it in accordance with pre-programmed instructions in ROM 24, as shown by broken arrow 28.

After being acted upon, or combined with the pre-programmed information from the ROM memory, the information will be pulled from RAM memory by the microprocessor and fed, as shown by broken arrows 29 and 30, to a video display chip 32, and/or a speech chip 34. The speech chip may include a sound generator 36. In this manner, information may be fed from the portable unit 11 to a video monitor 38 as shown by broken arrow 40. In addition to video information which may be displayed on the monitor, speech and/or sound information may be included and played separately from or synchronized with the video display.

Turning now to FIGS. 2 through 8 of the drawings, there shown are preferred embodiments of the scanner 12 and the code 41 of the present invention. The scanner or reading head is preferably hand-held, and easily transportable and/or handled by the user. The scanner includes a body 42 of any desired material having the required strength and opacity to light, and includes a handle portion 42a ending in an electrical connection 44, attached to the internal circuitry of the scanner and to the microprocessor 14. The remainder of the body includes a substantially rectangular lower portion 42b ending in a substantially flat reading surface 46 having an opening 48 formed therein.

An actuator switch 50 may be placed in one portion of the reading surface whereby when the scanner is placed over the code to be read, the actuator switch 50 will be pressed upwardly to start operation of the reading sequence, as described more fully hereinafter.

Figures 2, 3:
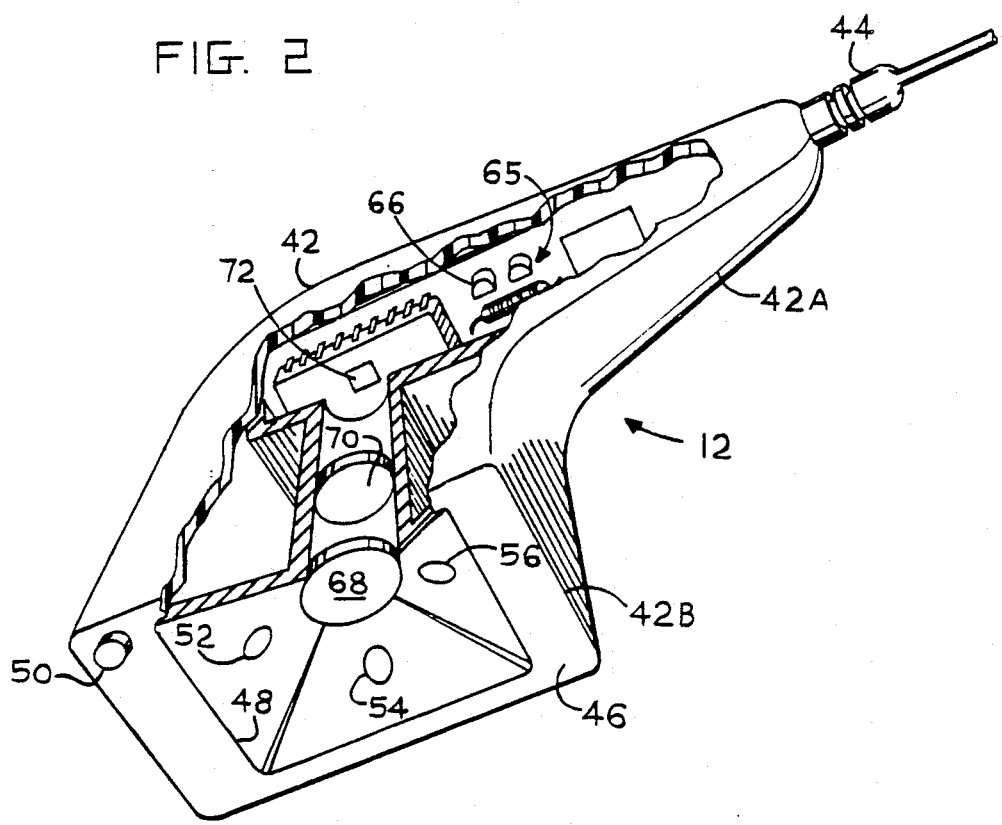
FIG. 2 is a perspective view of one form of a reader of the present invention, partially broken away, to show a cross-section of the internal portions thereof including a filtered light system.
FIG. 3 shows a schematic diagram of an alternate form of the reader shown in FIG. 2.
Figure 4:
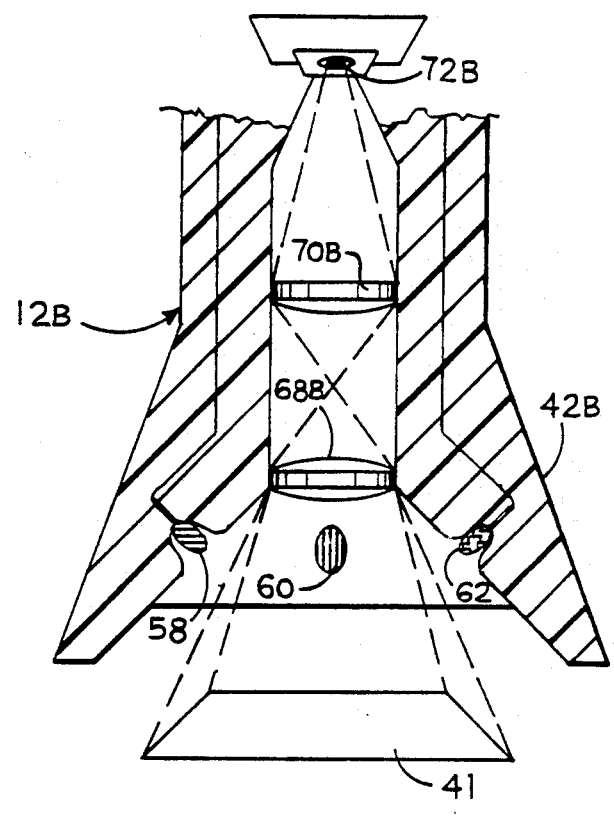
FIG. 4 is an enlarged sectional view of the reader of FIG. 2 showing LED light sources.
Figure 5:
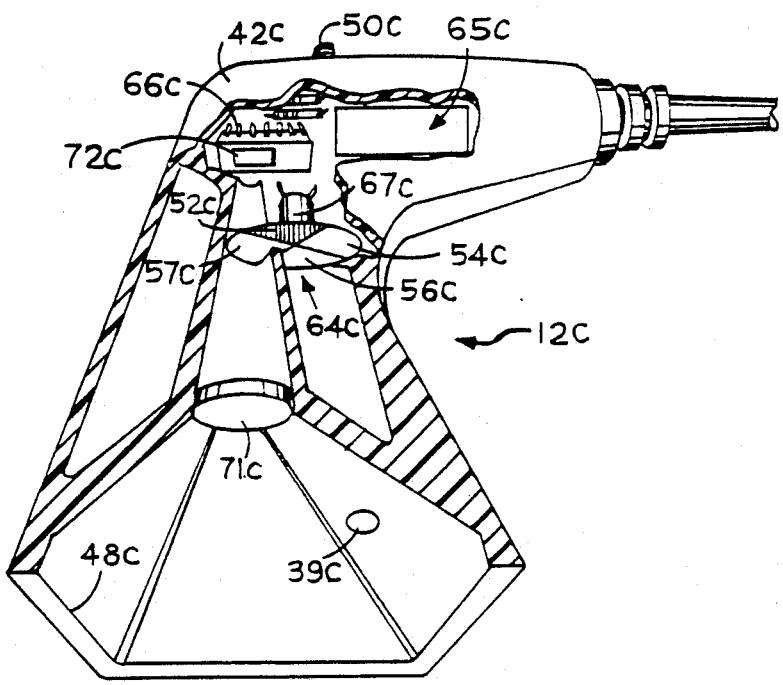
FIGS. 5 and 6 are still further alternate forms of readers having rotating filter discs contained therein.
Figure 6:
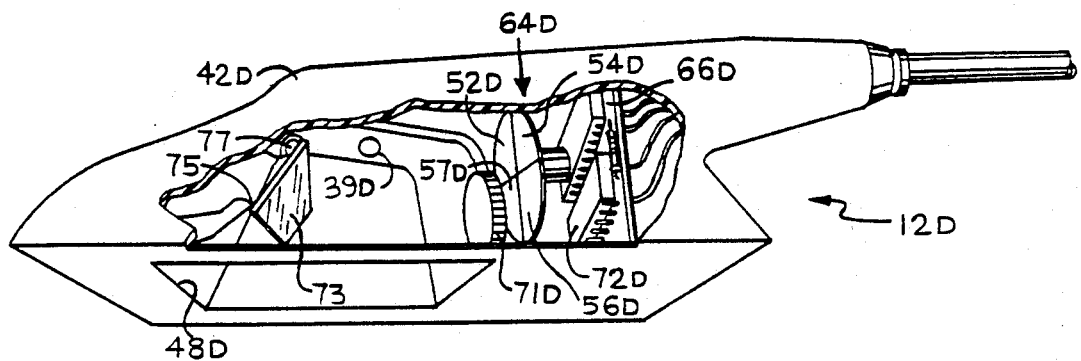
Figure 7:
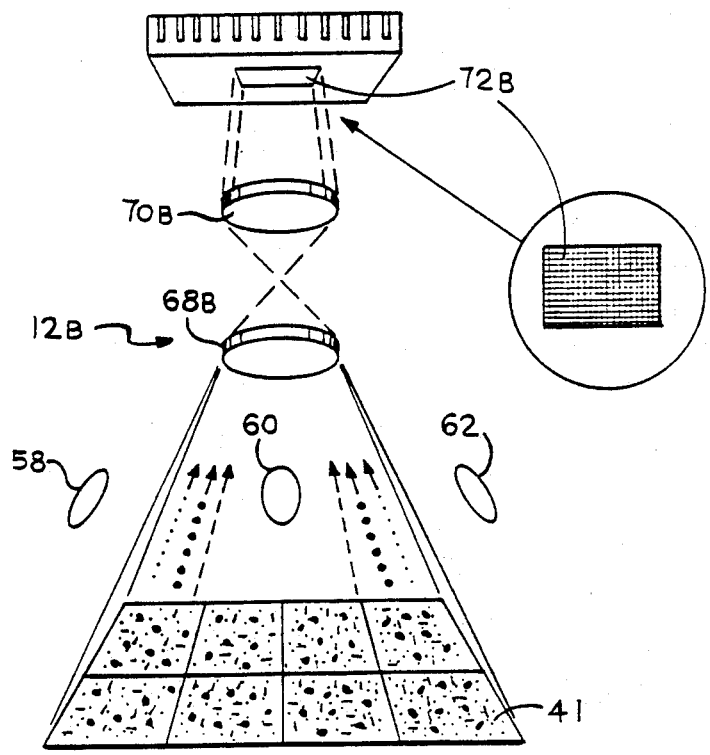
FIG. 7 is an exploded view showing the lens system and sensor of the reader of FIG. 4 in reading position over the novel code of the present invention.

Internally, the scanner may include a single light source with a number of colored filters as shown in FIGS. 3, 4, and 6; a plurality of light sources having various colored filters as shown in FIG. 2; or a number of different colored LEDS, as shown in FIGS. 4 and 7. For illustration purposes only, colored filters 52, 52C, 52D, 54, 54C, 54D and 56, 56C, 56D shown in FIGS. 2, 5, and 6, and the LEDS 58, 60, and 62, shown in FIGS. 4 and 7 are referred to as being blue, green and red.

In use, the printed code 41, shown more clearly in FIGS 3, 4, 7, and 8 is read by sequential illumination of the light source or sources. For example, the lights behind each of the blue, green, and red filters 52, 52C, 52D, 54, 54C, 54D, 56, 56C, 56D or the LEDS 58, 60, 62 are sequentially flashed by means of circuitry 65, known in the art, mounted in a printed circuit board (PCB) 66.

As shown in FIG. 2, at each flash of a separate light behind each of the filters 52, 54, 56, the image data reflected from the code 41 is focused through a series of lenses 68, 70, on to a light sensitive image receiving means 72 such as a photo diode, photo-transistor or charge coupled device (CCD chip). By way of example, the imaging device will be described as a CCD chip, but may take any form, presently known, or to be discovered. For example, the CCD chip in FIG. 2 is assumed to have a matrix array of 256×256 active elements. These elements align with some 200×200 dots on the code 41, which is assumed to be a data field of 1"×1", that is, have some 40,000 dots per square inch. Either the microprocessor firmware or the PCB board includes sensing means, known in the art, to determine whether or not there is satisfactory alignment with the code being read. If desired, this firmware could be used to automatically start the sequential reading cycle, once the alignment is proper. Each time a filtered light is flashed, the sensing elements on the CCD chip record an image corresponding to the colors of the code not filtered out. To insure proper operation of the scanner or reader, the rectangular portion 42b of Body 42 substantially blocks ambient light from entering the interior of the body when the reader is placed over the code.

After each scan of the light system, the data recorded on the CCD chip is transferred to the microprocessor and stored in RAM memory, as described previously. This reading and storage process is repeated until the RAM memory contains all of the data field being read. The microprocessor then acts on the data stored in RAM, using previously prepared programs stored therein to perform the necessary functions.

In the embodiment of the reader shown in FIG. 3, a single light source 39 is used. In this embodiment, the CCD chip 72A is sensitive enough so that it can differentiate between the different colored dots in the image data reflected from the code 41, each time the light 39 is flashed. That is, the CCD chip 72A records different wave lengths of light at each flash of the light 39. This may be done by direct reflection from the code 41 onto the sensitive elements of the CCD chip 72A or via a lens system similar to that shown in FIG. 2.

In another embodiment of the reader 12B shown in FIGS. 4 and 7, the different colored LEDS 58, 60, 62 are sequentially flashed, to flash light onto the code 41, as described above, to form the images recorded on the CCD image chip 72B via the lenses 68B, 70B.

FIG. 5 shows a further reader 12C having a body 42C similar to the body 42. An actuator switch 50C is placed on the top surface of the housing and is actuated by a finger of the user, once the reader is in position over the code to be read. As explained previously, the reader is not moved, but light is sequentially flashed onto the code, from a single light source 39C, reflected off the code 41, picked up by a lens system 71c, passed through a rotating filter disc 64C having, by way of example, four separate colored section 52C, 54C, 56C, 57C, and then to the image sensor 72C. The rotating filter disc 64C may have any desired number of colored filters thereon, or may contain gradations of one or more colors. The disc is driven by a motor 67C, through circuitry 65C on a PCB 66C, which may include a microprocessor, to enable the code to be sequentially read, stored and interpreted.

FIG. 6 shows an alternate embodiment similar to that shown in FIG. 5, wherein the light from a single light source 39D, when flashed, is reflected off of a pivoting mirror or other reflecting surface 73. The reflecting surface 73 is connected to a pivot point 75 to enable the mirror to be moved or tilted by a motor 77, each time the light source 39D is flashed. In this manner, the mirror reflects the light onto the code 41 a single line of dots or elements at a time. The image data, in the form of a line of dots is then reflected from the code 41 back to the mirror and from the mirror through filter disc 64D, to lens 71D to allow the line of dots to be recorded on a CCD chip 72D having one line of active elements in a linear array.

It being understood that if the CCD chip or other light sensitive imaging device used had more than one line of active elements, the mirror may be moved or tilted to enable the light to be reflected from and read a corresponding number of lines, each time the light source is flashed.

Figure 8:
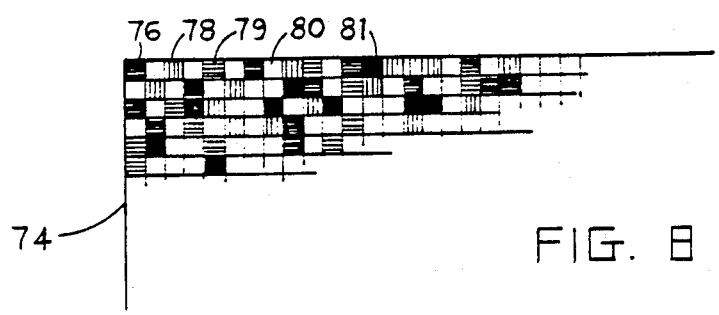
FIG. 8 is a top plan view showing an enlarged portion of the improved code of the present invention.

The printed code 41 to be read may be used as a computer program printed on paper or the like, such as a card, the page of a book or magazine, etc. The remainder of the card, book or page may contain human readable information or illustrations. FIG. 8 shows a greatly enlarged portion of a printed data field 74, assumed to be approximately 1"×1" square, comprising 200×200 dots or elements. That is, a large amount of information in varying colored dots, such as red, blue and green dots 76, 78, 79, together with white dots 80 and black dots 81 are printed within this data field 74. The field has the assumed printed density of 200 lines per inch. It should be understood, however, that neither the print density nor the size of the data field are important to the use of the code. In this example, five colors are used in printing the code, that is, red, blue, green, black and white. Again, it is not necessary for the code to use these identical colors or to use five colors. However, this combination has been selected for ease in explanation.

In the example set forth above, the field contains some 200×200, or 40,000 dots. In its simplest version using only two colors, such as black and white, this field would have 40,000 bits of data stored in the one inch square field.

A much larger density of data storage may be achieved by using more colors. In addition, the colored dots may, for convenience sake be assumed to be arranged in blocks. Each block may have two, three or more dots. Therefore, a block may be used to represent a symbol, an ASCII character, a graphic symbol, a word to be synthesized or a mixture of all of these.

A block containing two dots may represent up to 24 different symbols. A 1"×1" field would contain 20,000 blocks of this size. If each block contained three dots, they may represent 124 symbols and the field would hold 13,200 blocks. For a four dot block 624 symbols would be represented and the number of blocks would be 10,000 per field. Five dots per block could be used to display 3,124 kanji characters, enough for data processing, with some 8,000 characters being held in a field. If still more symbols need to be defined or represented, a six dot block can define 15,624 symbols and a field can hold 6,600 of these symbols.

For a clearer explanation of the reasoning behind those numbers, the last example will be explained in more detail. A six dot block may be an arrangment of six dots in a horizontal or vertical line, or as a block two by three dots. Therefore, with 200 dots per line divided by six equals 33 blocks per line and 33 blocks per line times 200 equals 6,600 blocks per field. The number of possible combinations of five colors in a six dot block may be envisioned by setting the colors equal to the numerals from 0 to 4. The number of ways these five numbers may be arranged in a six space line without repeating is equal to the number 444444 radix 5. The weight of these numbers would then be, for the least

| significant position: | Units |
|---|---|
| for the next: | 5 |
| for the next: | 25 |
| for the next: | 125 |
| for the next: | 625 |
| for the next: | 3,125 |

The value of the number 444444 would then be:

| | | |
|---|---|---|
| 4 × | 3,125 = | 12,500 |
| 4 × | 625 = | 2,500 |
| 4 × | 125 = | 500 |
| 4 × | 25 = | 100 |
| 4 × | 5 = | 20 |
| 4 × | 1 = | 4 |
| | | 15,624 |

To summarize, in the case of five colors in a six dot block, a total of 15,624 different symbols may be defined and a total of 6,600 of these symbols may be displayed in a one inch square field.

Depending on how the code is to be used, and what it is meant to represent will define which of the possible combinations of colors and dots will be the most effective. It can readily be seen that the code is not limited to one defined format. As explained previously, the interpretation of the data read is performed by the microprocessor and a command imbedded in the code may instruct the processor to interpret the code differently from that point on. In this manner, the number of different symbols the code describes may be changed to the number of symbols contained in a field of the code.

In using the reading system of the invention with the code, the versatility thereof can be readily seen. The system is initialized or started when power is first applied. The microprocessor in the system runs a short program stored in ROM on a processor board. The program need only bring the system up to the point where the reader is enabled. Any unused space in the ROM may be used to self test the system and to indicate to the operator, by audio or visual means that the system is operative or inoperative.

The remainder of the software for the system is printed in the code on a page or the like, as described previously.

After an operator receives a signal that the system is operative, the operator may select the printed program desired by merely placing the reader on the first field of the frame of data. The reader will begin reading when the sensor detects that it has been properly placed on a page or the actuator switch is activated.

The reader distinguishes between the actual data and the background of the field. As long as only background is seen by the reader, it is ignored and an indication is given to the operator that no data can be discerned. When actual data is detected the indication changes, so that the operator is at all times informed about the status of the system.

Depending on the image sensor used, the field may be seen by the sensor in its entirety, as is the case with a matrix array sensor. Or the sensor sees only a narrow line of the field when a linear array sensor is used. In either case a replica of the field and the distribution of the colors printed therein is read and built up in a workarea in RAM by the microprocessor, as explained previously.

The program that determines how to build this replica is able to correct for scanning at an angle to the boundaries of the field. This makes it unnecessary to place the reader in precise alignment with the field, since a rough alignment, with the field reasonably centered under the reader, will suffice. The program is also able to determine if the reader was placed on the correct field and if the read was successful. If a problem is encountered at this point, the microprocessor alerts the operator, and waits for an adjustment of the reader by the operator.

The system is and remains versatile. Alterations to existing peripheral equipment or the addition of new equipment may be readily accomodated since none of the routines for these accessories are permanently stored in ROM. Each time the system or related equipment is to be used, it is programmed from a printed card, page or the like containing the necessary information printed in the colored code of the instant invention.

It therefore can be seen that the code of the present invention allows much larger quantities of data per surface unit to be encoded than possible before. The data may be directly printed in a machine readable form on cards or in paper bound in books, magazines, periodicals and other media suitable for distribution. This drastically reduces the price of distributing encoded programs or other materials, as compared to magnetic or other materials presently used.

The data in the code is condensed and printed in a form that takes advantage of modern printing methods. In addition, the code is accurately retrieved using the capabilities of high density image sensors.

The density of the data per square inch may be further increased by printing the dots or elements in more colors, or in gradations of colors, as explained more fully above. It is, therefore, evident that by using different colors or gradations of colors and printing them in the code of this invention, allows for codes with far greater densities of information to be printed on less expensive materials and read from smaller areas.

Although the invention has been described in specific detail, the invention is not to be limited except by the attached claims.

What is claimed is:

1. In combination, a code and code reading system: said code comprising some 200 by 200 dots printed in at least five contrasting colors on a record medium in at least one data field:
said reading system comprising a scanning head adapted to be immoveably placed over and overlay said entire at least one data field, with no relative movement between said scanning head and said at least one data field as it is read:
said scanning head including activating means and means for sequentially flashing light upon said entire at least one data field to sequentially obtain data from said 200×200 dots printed thereon in said five contrasting colors;
said sequentially obtained data being recorded on an image recording means held in said scanner head;
means to feed said recorded image data to a random access memory (RAM) of a microprocessor to form a replica of said entire data field read and the distribution of the contrasting color dots printed therein, said replica of said data field being stored in said RAM until a predetermined number of sequential scans have been completed; and
decoding means in said microprocessor whereby said replica of said field in said RAM may be manipulated to perform assigned functions.

2. The code and code reading system of claim 1, wherein said at least five contrasting colors in the code are red, blue, green, black and white.

3. The code reading system of claim 2 wherein said at least one data field in which said 200 by 200 dots are contained is approximately 1" by 1" and said record medium is paper.

4. The code reading system of claim 2 wherein said means for sequentially flashing light comprises at least one light source, adjacent a number of different colored filters mounted within said scanning head, whereby light of a color determined by one of said filters will be flashed on said code and reflected light will be recorded on said image recording means.

5. The code reading system of claim 4, wherein said image recording means is a charge coupled device image chip.

6. The code reading system of claim 2 wherein said means for sequentially flashing light comprises a plurality of different colored light emitting diodes mounted within said scanning head in position to sequentially illuminate said code.

7. The code reading system of claim 6 wherein said image recording means is a charge coupled device image chip.

8. The code reading system of claim 2 wherein said means for sequentially flashing light comprises a plurality of lights, each of said lights having a different colored filter associated therewith whereby light of a different color will be flashed on said code through a different filter each time one of said plurality of lights is sequentially activated.

9. The code reading system of claim 8 wherein said image recording means is a charge coupled device image chip.

10. The code reading system of claim 2 wherein said scanning head includes a rotatable filter disc for filtering the light recorded on said image recording means.

11. The code reading system of claim 10 wherein said filter disc is composed of a plurality of different colored sections and said disc is rotatable by an electric motor mounted within said scanning head.

12. The code reading system of claim 11 wherein said means for sequentially flashing light in said scanning head is a single light source adjacent a single lens, said lens focusing light reflected from said code after said code is illuminated by said single light source through said filter disc and onto said image recording means.

13. The code reading system of claim 12 wherein said image recording means is a charge coupled device image chip.

14. The code reading system of claim 12 further including a tiltable mirror mounted in said scanning head in a position whereby it receives light from said single light source to reflect said light onto said code, and to further reflect light from said code onto said lens.

15. The code reading system of claim 14 wherein said mirror is pivoted about an axis by an electric motor held in said scanning head, and said image recording means is a charge coupled device image chip having a linear array of active elements to record said reflected image.

* * * * *